United States Patent
Gerber

(10) Patent No.: US 9,751,198 B2
(45) Date of Patent: Sep. 5, 2017

(54) SLIP-PROOF CLAMPING SYSTEM

(75) Inventor: Ernst Gerber, Reigoldswil (CH)

(73) Assignee: Rego-Fix AG, Tenniken (CH)

( * ) Notice: Subject to any disclaimer, the term of this patent is extended or adjusted under 35 U.S.C. 154(b) by 507 days.

(21) Appl. No.: 13/810,222

(22) PCT Filed: Jul. 7, 2011

(86) PCT No.: PCT/EP2011/003378
§ 371 (c)(1),
(2), (4) Date: Mar. 25, 2013

(87) PCT Pub. No.: WO2012/007127
PCT Pub. Date: Jan. 19, 2012

(65) Prior Publication Data
US 2013/0213194 A1    Aug. 22, 2013

(30) Foreign Application Priority Data
Jul. 16, 2010   (CH) ........................................ 1166/10

(51) Int. Cl.
| B25B 23/10 | (2006.01) |
| B23B 31/20 | (2006.01) |
| B25B 13/08 | (2006.01) |
| B25B 13/48 | (2006.01) |

(52) U.S. Cl.
CPC ............ *B25B 23/10* (2013.01); *B23B 31/201* (2013.01); *B25B 13/08* (2013.01); *B25B 13/48* (2013.01); *B23B 2231/2081* (2013.01); *B23B 2260/078* (2013.01); *B23B 2260/106* (2013.01)

(58) Field of Classification Search
CPC ......... B25B 13/48; B25B 13/50; B25B 13/02; B25B 13/065; B25B 13/04; B25B 13/00; B25B 27/0042
See application file for complete search history.

(56) References Cited

U.S. PATENT DOCUMENTS

| 1,397,876 A * | 11/1921 | Meldal ........................... 411/427 |
| 6,282,989 B1 * | 9/2001 | Sorter ...................... B25B 13/48 |
| | | 81/124.2 |
| 8,635,751 B2 * | 1/2014 | Zollmann ............. B23B 31/201 |
| | | 29/256 |
| 2001/0022118 A1 * | 9/2001 | Zollmann ............. B23B 31/201 |
| | | 81/176.15 |
| 2003/0145691 A1 * | 8/2003 | Gerber .................... B25B 13/02 |
| | | 81/176.15 |

FOREIGN PATENT DOCUMENTS

| CH | 278343 A | 10/1951 |
| DE | 10302529 A1 | 8/2003 |

* cited by examiner

*Primary Examiner* — Robert Scruggs
(74) *Attorney, Agent, or Firm* — Hammer & Associates, P.C.

(57) ABSTRACT

The slip-proof system consists of screw connection elements in the form of union nuts having recesses (6, 22) arranged in the lateral surface and of a spanner (11, 25, 30), which is provided with projections (14, 28, 32) engaging into the recesses and is intended for tightening and loosening said screw connection elements.

5 Claims, 3 Drawing Sheets

SLIP-PROOF CLAMPING SYSTEM

The present invention relates to a slip-proof system composed of a screw connection element having recesses for the engagement of a wrench, provided with cams which fit into the recesses, for tightening and loosening the screw connection element.

For screw connection elements, i.e., screws, nuts, and the like, in which the engagement of a tool for tightening and loosening the screw connection element takes place at the end face thereof, there is an increased risk of the tool inadvertently slipping off. The result, on the one hand, is possible damage to the screw connection element and to the tool, and on the other hand, possible injuries. The risk of injury is particularly high during clamping and unclamping of extremely sharp cutting tools in machine tools. Slip-proof clamping systems have therefore been developed to avoid this risk.

A system is known from DE 299 07 998 U, for example, in which the lock nut is provided with end-face, radially oriented grooves having a dovetailed cross section, a wrench having pins or cams with a likewise dovetailed cross section engaging with the grooves in order to tighten and loosen the lock nuts. The dovetail joint between the wrench and the lock nut is intended to prevent the wrench from inadvertently slipping off during the clamping process.

A slip-proof clamping system is known from DE 103 02 529, in which the side flanks of the grooves and cams have an S-shaped profile to avoid the disadvantages of the dovetailed cross section of grooves and cams.

A clamping system composed of a lock nut and a wrench is known from EP 1 563 959, in which the end-face cams of the lock nut or of the wrench are provided with additional undercuts to increase the security against slipping off.

The object of the invention is to enable the principle of slip-proof cooperation of a screw connection element and a wrench having an end-face engagement to be used for other applications.

This object is achieved according to the invention in that the screw connection element is a union nut having a cylindrical lateral surface and a ring-shaped end face, and the recesses extend axially parallel from the end face over at least a portion of the lateral surface, and the wrench is provided with cams which in the axial direction are insertable into the recesses.

Preferred exemplary embodiments are characterized by the features set forth in the subclaims.

Preferred exemplary embodiments of the invention are described below with reference to the accompanying drawings, which show the following:

Figure 3:
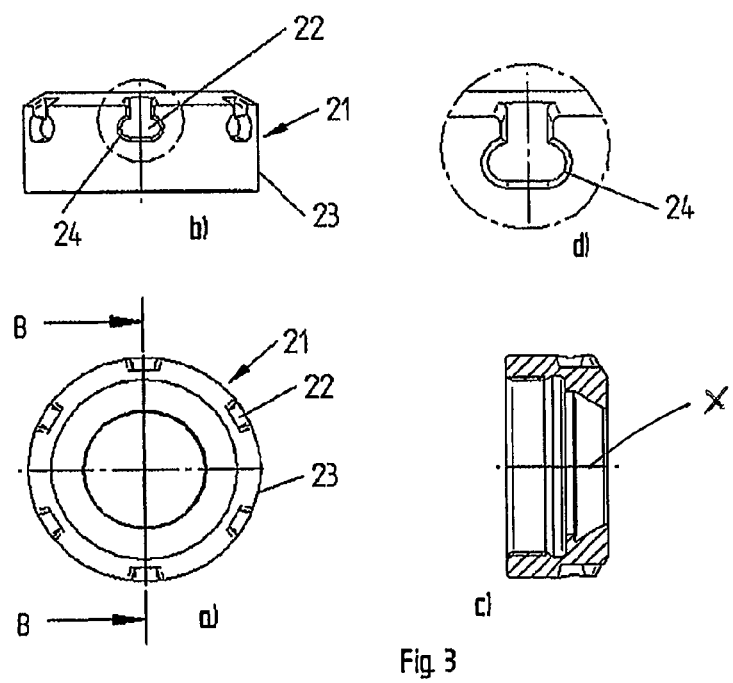
FIG. 3 shows a lock nut having recesses with a different shape, and in particular shows a) an axial top view of the end face, b) a side view, c) a section along the line B-B, and d) an enlarged partial view of a recess.
Figure 4:
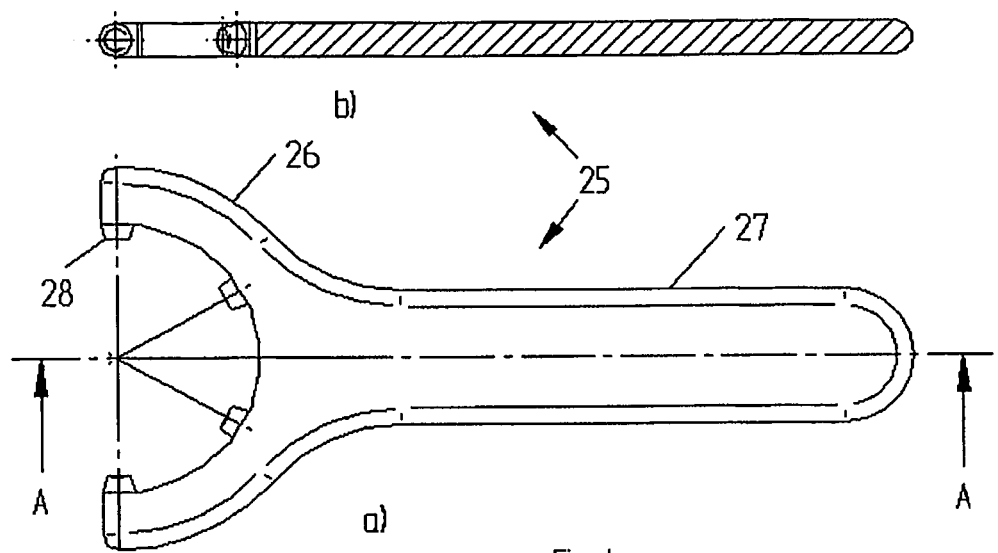
Figure 5:
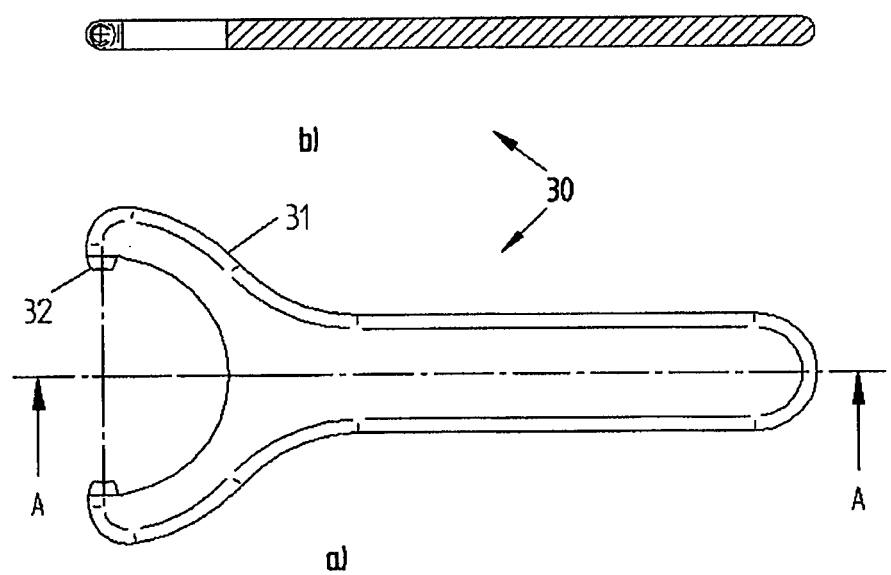

FIG. 4 shows a wrench having four cams for engagement with the recesses in the lock nut shown in FIG. 3, and in particular shows a) a side view perpendicular to the handle and b) a section along the line A-A; and FIG. 5 shows an alternative form of a wrench having two cams for engagement with the recesses in the lock nut shown in FIG. 3, and in particular shows a) a side view perpendicular to the handle and b) a section along the line A-A.

The lock nut 1 shown in FIGS. 1a-1d in the form of a union nut has, as is known in conventional lock nuts, an inner cone 2 for the centered gripping of a collet chuck, a thread 3 for screwing onto the external thread of a machine tool spindle or tool holder, a ring-shaped end face 4 projecting perpendicular to the axis X, and an essentially cylindrical lateral surface 5.

The lateral surface is provided with six recesses 6 which are distributed uniformly, i.e., at angular distances of 60°, over the circumference, and which extend axially parallel from the end face into the lateral surface. The depth of the recesses in the radial direction is approximately one-half the wall thickness of the lock nut. The base 7 of the recesses is curved corresponding to the axial distance. The openings or orifices in the recesses facing toward the end face each have a width in the tangential direction which corresponds to approximately 30° to 40° of the circumference of the lock nut. The recesses maintain this width over an outer area 10 which extends over approximately one-half their axial length. The flat side walls 8 in this outer area are defined by axial planes, and are thus perpendicular to the base 7. In an inner area adjoining the outer area, the recesses are expanded by oppositely situated semicircular protrusions 9 of the side walls in the tangential direction to a maximum width corresponding to approximately 40° to 45° of the circumference.

Figure 1:
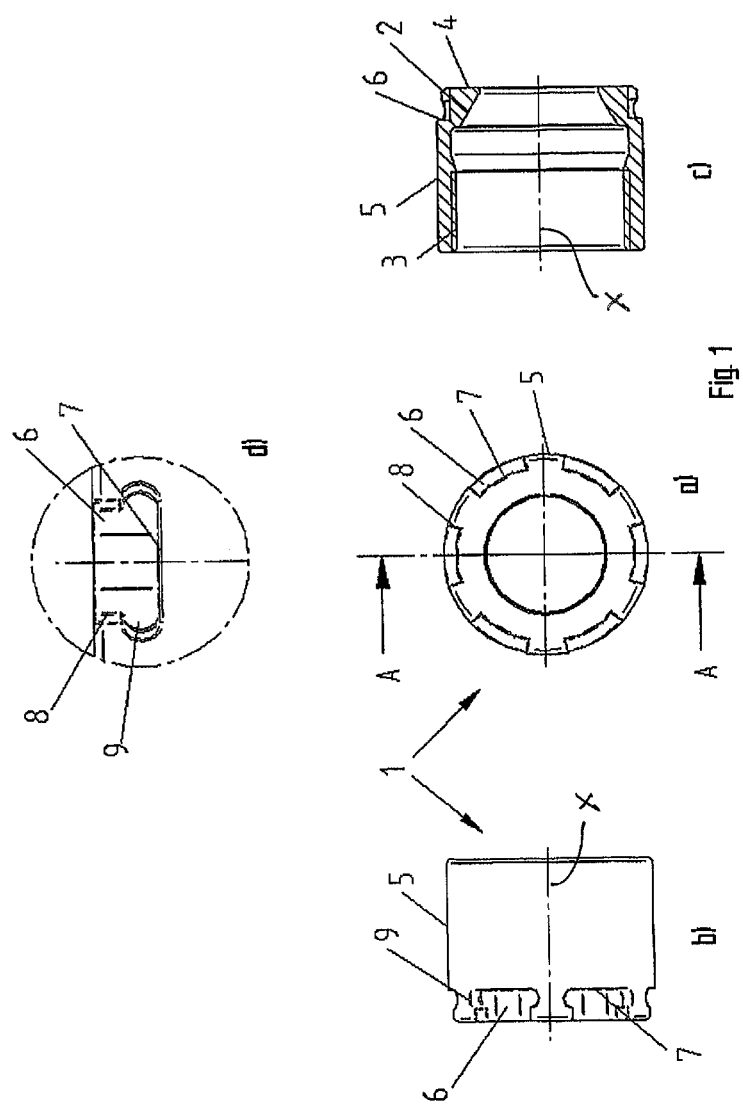
FIG. 1 shows a lock nut having six recesses, and in particular shows a) an axial top view of the end face, b) a side view, c) a section along the line A-A, and d) an enlarged partial view of a recess.
Figure 2:
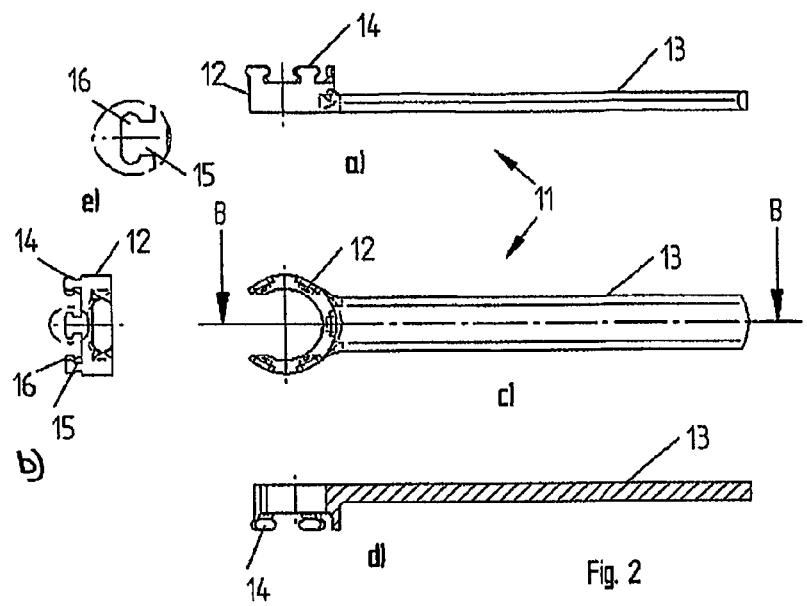
FIG. 2 shows a wrench having cams for engagement with the recesses in the lock nut shown in FIG. 1, and in particular shows a) a side view perpendicular to the handle, b) a side view from the side of the handle, c) a top view, d) a section along the line B-B, and e) an enlarged partial view of a cam.

The wrench 11 shown in FIG. 2, having a head 12 and a handle 13, is used for tightening and loosening the lock nut described above. The head has the shape of a ring segment of approximately 250°. Axially projecting cams 14 are symmetrically arranged on the ring segment at uniform angular distances of 60°, and engage with the recesses in the lock nut when the wrench is inserted. As is apparent in the side views and the detailed view, the cams have a mushroom-like shape, with a narrower neck part 15 and semicircular enlargements 16 adjacent thereto on both sides. The shape of the enlargements conforms exactly to the protrusions 8 of the recesses in the lock nut 1.

The tangential width of the enlargements 16 is slightly less than the tangential width of the outer area of the recesses in the lock nut. In this way the wrench may be placed against the lock nut in the axial direction, the cams 14 being inserted into the recesses 5. By rotating the wrench for tightening or loosening the lock nut, i.e., when a torque is active, the enlargements of the cams engage with the protrusions in the recesses, so that it is not possible for the wrench to slip off axially.

In addition to reliably preventing the wrench from slipping off, this system is advantageous due to the small space requirements at the periphery of the lock nut, and its simple manufacture. Another advantage is that the force transmission shoulder is at right angles to the action of force; i.e., the force acts optimally in the tangential direction. Lastly, a further advantage is that a large variety of wrench shapes having the same secure engagement with the nut are possible, for example as a socket wrench or push-on sleeve, for attaching a socket designed as a hexagon wrench or torque wrench, or as an extension having a further interface.

The lock nut 21 shown in FIG. 3, the same as the lock nut 1 described above, is provided with six recesses 22 in its lateral surface 23, distributed over the circumference. The shape of these recesses is similar to that of the lock nut 1; i.e., they have a narrower outer area and an expanded inner area adjacent thereto with oppositely situated protrusions 24. However, the width of the recesses in the tangential direction is smaller, and corresponds to only approximately 15° in the narrower outer area and approximately 25° in the expanded inner area.

Wrenches which are suitable for this lock nut are shown in FIGS. 4 and 5. The wrench 25 shown in FIG. 4 has a head 26 and a handle 27. The head has the shape of a ring segment of approximately 180°. Four radially projecting cams 28 are symmetrically arranged on the inner side of the ring segment at uniform angular distances of 60°, and engage with the recesses in the lock nut when the wrench is inserted. As is apparent in the sectional illustration in FIG. 4*b*, the cams have the shape of a truncated cone which conforms exactly to the protrusions 24 of the recesses in the lock nut 21.

The width of the cams is slightly less than the width of the outer area of the recesses in the lock nut. In this way the wrench may be placed against the lock nut in the axial direction, the cams 28 being inserted into the recesses 22. By rotating the wrench for tightening or loosening the lock nut, i.e., when a torque is active, the cams engage with the protrusions 24 of the recesses, so that it is not possible for the wrench to slip off axially.

The wrench 30 shown in FIG. 5 is similar to the wrench according to FIG. 4, but has only two cams 32 which are located at the oppositely situated ends of the ring segment-shaped head 31. When this wrench is placed against the lock nut 21, the cams are inserted into oppositely situated recesses 22 in the axial direction. When this wrench is rotated, the cams likewise engage with the protrusions of the recesses, so that slipping off is not possible.

The invention claimed is:

1. A slip-proof system comprising:
   a screw connection element having recesses and a wrench with cams which fit into the recesses,
   the screw connection element has an axis, a cylindrical lateral surface and a ring-shaped end face,
   the recesses extend axially parallel from the end face over at least a portion of the lateral surface,
   a radial extension of the recesses being restricted to a part of the wall thickness of the screw connection element,
   the recesses having opposing side walls, the side walls confining the recesses in angular direction and having an outer area and an inner area, and a base extending in angular direction between the side walls and confining the recess in axial direction opposite the ring-shaped end face,
   the side walls being flat and defined by planes containing the axis in the outer area extending from the end face to about half of the axial length of the recesses,
   the recesses being expanded by oppositely situated semicircular protrusions of the side walls in the inner area adjoining the outer area of the side walls, and
   the wrench has a head which is provided with cams which in the axial direction are insertable into the recesses.

2. The slip-proof system according to claim 1, wherein the cams of the wrench are provided with enlargements, situated at a distance from the head, which fit into the protrusions of the recesses.

3. The slip-proof system according to claim 1, wherein the wrench head is provided with radially inwardly directed truncated cone-shaped cams.

4. The slip-proof system according to claim 1, wherein the greatest tangential width of the cams is less than the smallest tangential width of the recesses.

5. A slip-proof system comprising:
   a screw connection element having recesses and a wrench with cams which fit into the recesses,
   the screw connection element has a cylindrical lateral surface and a ring-shaped end face,
   the recesses extend axially parallel from the end face over at least a portion of the lateral surface,
   a radial extension of the recesses being restricted to a part of the wall thickness of the screw connection element,
   each recess has opposing axially extending side walls and a radial base interconnecting the side walls, the side walls and base define each recess, each side walls has an outer area and an inner area, the outer area includes an axially extending flat plane, the flat plane of each side wall face each other, the inner area adjoined to the outer area includes an axially extending expanding semicircular protrusion, the semicircular protrusion of each side wall face each other, and the base interconnects the semicircular protrusions of each side wall, and
   the wrench has a head which is provided with cams which in the axial direction are insertable into the recesses.

* * * * *